Patented Sept. 24, 1935

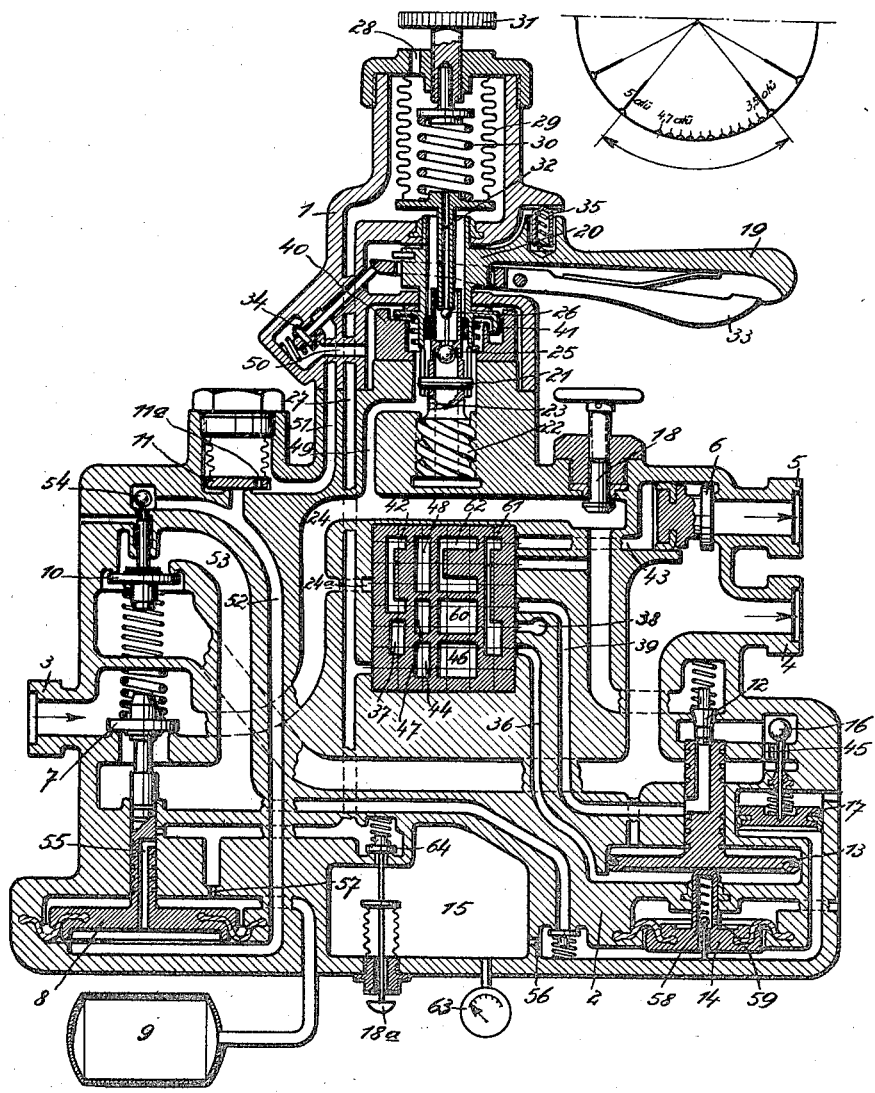

2,015,181

UNITED STATES PATENT OFFICE 2,015,181

DRIVER'S BRAKE VALVE FOR COMPRESSED AIR BRAKES

Friedrich Hildebrand, Lankwitz, Berlin, and Ernst Möller, Karlshorst, Berlin, Germany, assignors to Knorr-Bremse Aktiengesellschaft, Lichtenberg, Berlin, Germany, a joint-stock company of Germany Application August 10, 1934, Serial No. 739,198
In Rumania June 23, 1934

12 Claims. (Cl. 303—54)

This invention relates to driver's brake valves for compressed-air brakes, of the kind in which within thhe range of movement of the operating lever for the different degrees or stages of the service braking, each position of the operating lever corresponds with a definite brake pipe pressure, and the consecutive positions of the lever are marked by notches in one part (casing) and a spring pin cooperating with the said notches in another part (operating lever), the distance from one notch to another corresponding with a pressure alteration in the brake pipe of about 0.1 atm., while the distance of the first service braking notch from the travelling position corresponds with about 0.3 atm.

The driver's valve is particularly intended and suitable for those types of construction of compressed-air brakes, wherein the control valves arranged at the ends of the vehicles are adapted both for stepwise braking and for stepwise releasing of the brakes.

A driver's valve according to the invention is provided with a number of separate arrangements, by which the operation of the brakes is considerably facilitated, in that the process of filling the brake pipe upon the stepwise or complete releasing of the brakes is automatically regulated in accordance with the length of the train, in such a manner that the filling of all auxiliary containers in the train is carried out with the greatest possible speed, but, on the other hand, is interrupted in good time in order to avoid with certainty the overloading of the auxiliary containers which has hitherto frequently occurred, particularly in the first part of the train, owing to inefficient operation of the driver's valves which have long been known.

Consequently, the driver's valve according to the invention is so arranged that the filling of the brake pipe is initiated with a high pressure period commencing rapidly, which is automatically terminated as soon as the first auxiliary air reservoir in the train (that is to say that of the locomotive or a compensating reservoir to be filled in similar conditions) is filled up to the complete releasing pressure or up to the pressure corresponding to the intended releasing stage. The instant at which this takes place varies with the length of the train; it occurs earlier in the case of a short train, and later in the case of a long train. Then follows a low pressure filling period, in which the brake pipe is filled with that pressure which corresponds to the pressure adjusted by the pressure regulator or lies only slightly above this. During this period, the filling of the brake pipe decreases in the degree in which the flow is reduced therein, and this period is automatically terminated when the flow in the brake pipe ceases. When this has occurred, only a throttled communication exists between the pressure regulator and the brake pipe, whereby the latter only receives those small quantities of compressed air which escape owing to the unavoidable small pipe leakages. This throttled communication is so narrow that it does not disadvantageously influence an emergency braking effected from the train or the rapid braking occurring immediately behind the locomotive when the train is disconnected.

In addition, the driver's valve according to the invention is provided with an arrangement by which the automatic compensation of the compressed air escaping through leakage from the brake pipe may be obviated when the operating lever is in the service braking position. This arrangement is used when the locomotive fitted with the driver's brake valve according to the invention drives a train the waggons of which are all, or for the greater part, fitted with the usual single-chamber compressed-air brake, which, although permitting of a stepwise application of the brakes, does not enable a stepwise release thereof. With this brake, the subsequent flowing of compressed air into the brake pipe when the brake is applied would result in the reversal of the control valves into the releasing position and complete release, which must not be permitted under any circumstances in the interest of the safety of operation.

The driver's brake valve according to the invention is also distinguished by a device which renders it possible to connect the locomotive with a train in the brake pipe of which a pressure somewhat higher than the brake pipe pressure of 5 atmospheres prevails, without the brakes in the train or, at least, in the front part of the train being applied.

Further advantages and special properties of the driver's valve according to the invention will be apparent from the following description given with reference to the drawing and from the explanation of the method of operation of the driver's valve.

In the accompanying drawing, the driver's valve according to the invention is schematically illustrated in section in Figure 1, and Figure 2 represents the different positions of the operating lever. The radial lines in Figure 2 correspond to the positions of the operating lever, of which the following are present, namely, from left to right;

(1) The neutral position, in which the operating lever of the second locomotive is placed when the train is driven by two locomotives, (2) The travelling position, (3) A series of service braking positions, between the travelling and full service position, and (4) The emergency braking position.

In the centre of Figure 1 a diagram of the rotary slide valve (40) is shown.

The horizontal lines designate the channels leading to the slide valve grate or slide valve face. The surfaces left blank in the illustration show which channels are placed in communication with one another in the various positions of the operating lever.

The vertical lines represent the positions of the operating lever from left to right in the same succession as shown in Figure 2. The range between the third and fourth vertical line represents the series of service positions.

The casing of the driver's valve consists of an upper part 1 and a lower part 2. The latter is connected by the connecting pipe 3 to the main air container, and by means of the pipe 4 to the brake pipe passing through the train. 5 is a pipe leading into the atmosphere, which is controlled by the rapid braking valve 6. In the lower part 2 of the casing is situated the high pressure filling valve 7 with the associated control piston 8 and the compensating auxiliary reservoir 9, as well as the flow valve 10. Both valves control the connection, on which the high pressure filling period depends, between the main air container and the brake pipe, and between the connecting pipes 3 and 4. The admission of air on one side of the control piston 8 influencing the high pressure filling valve 7 is regulated by a filling impulse valve 34 and a valve device 11 referred to as an interrupter, and the removal of air from the piston by the flow valve 10 and by a valve 54 connected therewith. The admission on the other side of the piston 8 takes place in accordance with the pressure (adjusted by throwing over the operating lever 19) in the compensating auxiliary reservoir 9.

In the lower part 2 of the casing is a compensating valve 12, which is controlled by the compensating piston 13 which is, on one (the upper) side, under the pressure of the main brake pipe and, on the other (lower) side, under the pressure of the pressure regulator adjusted by means of the operating lever. With the compensating piston 13 is associated the additional piston 14, which is, on one (the upper) side, under atmospheric pressure, and, on the lower side, under the pressure which prevails in a container 15 acting at a certain time.

A section-changing valve 16 is situated behind the compensating valve 12 and is controlled by a piston 17 to which, on one (the upper) side, atmospheric pressure is admitted, and, on the other (lower) side, the pressure which prevails at a certain period in the container 15.

A closing valve 18 situated in the lower part 2 of the casing serves to block the connection, controlled by the compensating valve 12, between the main air container connecting pipe 3 and the brake pipe (connecting pipe 4) in all positions outside of the travelling position, if a train chiefly fitted with a single-chamber brake that cannot be released in steps is to be driven. The container 15 acting at a certain period, which is normally automatically filled through a nozzle 56 in the open position of the high pressure filling valve 7, can be arbitrarily filled with any desired pressure by means of an equalizing valve 64.

In the upper part 1 of the casing of the driver's valve is situated the pressure regulator with the operating lever 19, which is provided with a hub 20 rotatably mounted in the upper part of the casing. This hub is hollow and is coupled by means of the bolt 21 with the screw-threaded spindle 22, which is rotatable and may be screwed upwards and downwards according to the pitch of its thread. The screw-threaded spindle 22 is bored in the longitudinal direction and is in communication through a lateral bore 23 with the channel 24 constantly filled with compressed air from the main container. In the interior of the upper part of the screw-threaded spindle 22 is situated the double valve 25—26. The valve 25 controls the communication between the main air container connection 3 and the channel 27, in which the pressure is adjusted according to the position of the operating lever 19. The valve 26 controls the communication between the channel 27 and the spaces connected thereto and the aperture 28 leading to the atmosphere. A resilient corrugated cylinder 29, the inner space of which is in communication with the atmosphere through the aperture 28, separates the spaces of different pressure in the upper part 1 of the casing. A spring 30, the tension of which may be varied by means of the regulating screw 31, loads the part 32, which forms the seat of the valve 26. To the operating lever 19 is articulated the filling impulse pawl 33, by means of which the filling impulse valve 34 is operated. The filling impulse pawl 33 is so arranged that it does not influence the filling impulse valve 34 in the neutral position and in the rapid braking position.

In the upper part 1 of the driver's valve is also mounted the rotary slide valve 40, which is coupled with the rotary part 20 by means of the pin 41. A resilient snap device 35 arranged in the operating lever 19 cooperates with the notches in the upper part of the casing shown in Figure 1.

When the operating lever 19 is in the neutral position, the space situated under the compensating piston 13 is connected through the channels 36 and the space 37 in the rotary slide valve 40 with the aperture 38 leading to the atmosphere. The pressure prevailing in the brake pipe (connecting pipe 4) holds the piston 13 in its lowest position. The channel 39 is filled with pipe air, and the channel 39 is held in communication with the channel 43 through the space 42 (slide valve illustration), so that the control piston of the rapid braking valve 6 is under brake pipe pressure at its left end surface and the rapid braking valve is held closed. Fluctuations of the brake pipe pressure have no influence on the driver's brake at the locomotive on which the driver's valve is in the neutral position. The neutral position is imparted to the driver's valve only at the second locomotive if the train is driven by two locomotives.

In the travelling position, the channel 36, which leads to the space situated under the compensating piston 13, is in communication with the channel 27 through the slide valve space 44, which channel 27 leads to the pressure regulator space in which the resilient body 29 is situated. In the brake pipe (connection 4), the releasing pressure (5 atmospheres) adjusted by the driver's valve is maintained because upon sinking of the pipe pressure owing to leakages, the constant pressure-regulator pressure acting under the piston 13 lifts the piston 13. This piston 13 opens the valve 12 having a double seat, and compressed air now flows out of the main air container connected by the pipe 3, through the channel 24 and the valve 12 and through the narrow feed bore 45 into the brake pipe, until the same pressure prevails in the latter as that which is adjusted by the operating lever 19, whereupon the piston 13 is moved downwards until the feed valve 12 is closed.

The channel 39 is also connected in the travelling position with the aperture 38 leading to the atmosphere by the hollow part 47 of the slide valve. The channel 24a extending from the channel 24 communicates through the slide valve space 48 with the channel 43, so that the rapid braking valve 6 is held closed by admission of pressure from the main container to its control piston.

As a special filling or releasing position is not provided, provision is made for rapid filling and releasing by special means, namely by the filling impulse valve 34, which may be operated by means of the filling impulse 33, when the operating lever 19 of the driver's valve is in the travelling position or in one of the service braking positions. The operation of the filling impulse pawl 33 leads to the opening of the filling impulse valve 34, which allows compressed air to flow from the main air container (connecting pipe 3) through channel 24, branch channel 49, and through the rotary slide valve 40 and channel 50 into the channel 51, which in normal circumstances, is free from pressure. The interrupting valve 11 is thereby lifted and the air from the main container flows through channel 52 into the space below the piston 8. This piston is lifted and opens the high-pressure filling valve 7. Air from the main container flows through the opened high-pressure filling valve 7 into the channel 53 and opens the flow valve 10, through which, consequently, a connection is established between the main air container (connection 3) and the brake pipe (connection 4). Opening of the flow valve 10 results in closing of the air-extraction valve 54, so that the pressure acting under the piston 8 is at first maintained. The interrupting valve 11 is provided with a nozzle 11a, through which a cushioning body connected with the valve 11 is gradually filled with compressed air. When equal pressure prevails on both sides of the valve 11, it is closed. In this way, provision is made for preventing the irregular or excessively long operation of the filling impulse pawl 33. The filling impulse pawl only requires to be momentarily operated. The piston 8 has a bore 55, the mouth of which, extending at right angles to it, covers the mouth of the channel 27. Consequently, the main container pressure acting immediately after the opening of the filling impulse valve 34 on the lower side of the piston 8 is gradually compensated by the pressure of the pressure regulator adjusted by the operating lever 19. Simultaneously with the compressed air passing through the flow valve 10 into the brake pipe when the operating lever 19 is situated in the travelling position or in the service braking position, compressed air of the pressure determined by the pressure regulator flows under the compensating piston 13, which opens the compensating valve 12 and also allows compressed air in this way to flow into the brake pipe. This compressed air is of a pressure corresponding to the position of the operating lever 19. The section-changing valve 16 is thus opened, because its piston 17 is stressed with compressed air from below, as—so long as the high pressure filling valve 7 is open—the container 15 acting at a certain period is filled through the nozzle 56 with compressed air. Owing to this fact, the piston 14 provided in addition to the compensating piston 13 is made accessible to compressed air and takes part in the opening of the compensating valve 12. Through the nozzle 57, the compensating auxiliary reservoir 9 is gradually filled with compressed air of a pressure corresponding to the position of the operating lever 19 and that of the pressure regulator parts influenced thereby. As soon as the pressure in the compensating auxiliary reservoir 9 corresponds to the adjusted pressure of the pressure regulator, pressure equality prevails on both sides of the piston 8. The piston sinks under the action of the spring acting on the valve 7, and the high-pressure filling valve 7 is thereby closed. The high pressure filling period is thus terminated. Its duration therefore depends on the building up of the pressure in the compensating auxiliary reservoir 9.

The further filling of the brake pipe takes place in the low pressure filling period through the compensating valve 12 in sympathy with the pressure acting on the lower side of the piston 13, and also in sympathy with the operation of the additional piston 14. As long as there is still pressure in the container 15 acting at a certain period, filling of the pipe with increased pressure takes place. In the degree that the pressure rises in the pressure pipe, the piston 13 moves further and further downwards and, with it, the additional piston 14. The impulse valve 58 situated in the latter thus comes in contact with the wall of the casing of the driver's valve; it is held fast with respect to the slowly sinking piston 14, and is therefore opened and allows the compressed air to escape from the container 15 acting at a certain period, through the air-discharge nozzle 59. Consequently, the adjusting force of the piston 17 also ceases, the section-changing valve 16 is closed, and the connection controlled by the compensating valve 12 between the channel 24 and the brake pipe is now only open through the narrow aperture 45. When equal pressure prevails on both sides of the piston 13 and the time container 15 is completely relieved of air, the filling of the brake pipe is terminated.

In the case of short trains, the flow which opens the flow valve 10 stops comparatively quickly. Consequently, the flow valve 10 is soon closed again, and the air-discharge valve 54 connected therewith discharges the air from the space under the piston 8, and the high-pressure filling valve 7 is rapidly closed before the compensating auxiliary reservoir has attained the pressure of the pressure regulator.

For the purpose of service braking, the operating lever 19 is placed in one of the service braking positions, whereby the screw-threaded spindle 22 moves downwards. The valve 25 then remains closed and the valve 26 is lifted from the longitudinally bored part 32 situated above it. Compressed air therefore escapes from the channel 27 and the spaces connected with it, through the aperture 28 into the atmosphere, until the pressure bearing on the outer surface of the cushioning body 29 has been so decreased that the spring 30 again brings the part 32 on to the valve 26, and the latter is thus closed. The reduction of the pressure in the channel 27 also extends through the hollow space 46 in the rotary slide valve 40 to the space below the compensating piston 13.

The latter moves downwards, the lower part of the valve 12 is lifted from the part of the channel 39 lying in the stem of the piston 13, and the brake pipe is thus connected through the slide valve space with the aperture 38 leading to the atmosphere. The pressure in the brake pipe sinks, and as soon as it has dropped to the extent of the pressure acting on the lower side of the piston 13, the piston 13 is lifted precisely so far that the valve 12 again closes the channel in the piston 13. Should there be any leakages in the brake pipe, the piston 13 is raised, as the pipe pressure acting on its upper end is reduced owing to the leakages. The valve 12 opens communication between the pipe (connection 4) and the channel 24, and so much air flows from the main container into the brake pipe that the pressure at the upper end of the piston 13 again increases, the said piston sinks, and again closes the valve 12. The hollow space 62 connects the channel 43 leading to the rapid braking valve 6 with the channel 24a. The rapid braking valve 6 is held closed by the main container pressure.

In single-chamber brakes of the older type of construction, which are not suited for stepwise release, this subsequent flowing of compressed air from the main air container into the brake pipe would result in the brakes being completely released without this being intended. In order to avoid this, the closing-off valve 18 is provided, which is closed for this purpose. Communication between the channel 24 and the compensating valve 12 then no longer exists, and therefore, even when the latter is lifted, no air can pass from the main container into the brake pipe (connection 4).

For the purpose of rapid braking, the operating lever 19 is placed in the rapid braking position. In this position, the rotary slide valve 49 connects both the channel 36 and the channel 43 directly with the aperture 38 leading to the atmosphere, through the hollow space 61. The piston 13 sinks, the valve 12 releases the centre bore in the stem of this piston, and brake pipe air escapes into the atmosphere. At the same time, the piston of the rapid braking valve 6 is freed from pressure, and this valve is opened and immediately allows the compressed air to escape from the brake pipe (connection 4) over a large cross-section through the connection 5.

In order to indicate to the engine driver when the last brake in the train is released, a manometer 63 or an equivalent device is connected to the container 15 acting at a certain period. When this manometer indicates that the container 15 is pressure-free, the additional piston 14 is released from pressure, the pressure at both ends of the equalizing piston 13 is equally great, and there is therefor no further flow in the brake pipe after it has been filled, and all brakes are released.

In the case of a train, it may occur that, owing to inaccuracy of the pressure-regulator spring, or owing to inaccuracy of the indication on the pipe pressure manometer during changing of the locomotive, a pressure prevails in the brake pipe when the locomotive is uncoupled which is somewhat greater than the normal pressure of five atmospheres, and that the new locomotive which takes over the train has in its brake pipe the prescribed pressure or a pressure lying only slightly below this pressure. Owing to flowing over of compressed air from the train pipe into the pipe of the locomotive, the brakes then have a tendency to come into action, at least in the front part of the train.

In order to avoid this, according to the invention an equalizer 18 is provided at the driver's brake valve. This is operated shortly before the locomotive is coupled to the train. The valve 64 is thus opened, compressed air of the pressure of the pressure regulator passes into the container 15, and therefore also under the additional piston 14, the compensating valve 12 is somewhat lifted, and main container air flows into the brake pipe of the locomotive. Consequently, a lower pressure does not prevail in this brake pipe than in the brake pipe of the train, and therefore no compressed air can flow from the latter to the locomotive, so that no brakes can be applied in the train.

What we claim and desire to secure by Letters Patent of the United States is:—

1. In a driver's valve for a compressed air brake, connections with a source of compressed air and with a brake pipe, a pressure regulator operable by a rotary lever, a pawl on said lever, a filling impulse valve operated by the pawl and adapted to be opened by pressure applied on said pawl, a high-pressure valve controlled by said filling impulse valve, a flow valve adapted to be opened by air pressure arriving through said high pressure valve, said flow valve controlling communication between the source of compressed air and the brake pipe.

2. In a driver's valve for a compressed air brake, connections with a source of compressed air and with a brake pipe, a high pressure valve adapted to control the admission of compressed air to said brake pipe, a pressure regulator including means to open and close said high pressure valve, a compensating valve and a section changing valve adapted to admit air at lower pressure from said regulator to said brake pipe after closure of said high pressure valve, an auxiliary air container, movable pistons adapted to open said compensating valve and section changing valve when actuated by the pressure in said auxiliary air container, and automatic means for filling and exhausting said auxiliary air container.

3. In a driver's valve as claimed in claim 1 means to open and close the high pressure valve, including a compensating air container, a piston operatively connected with said valve and normally exposed to a pressure from said container tending to close said valve, the other side of said piston being exposed upon actuation of the pressure impulse valve to a pressure tending to effect the opening of the high pressure valve, and a spring to close said high pressure valve upon equalization of pressure on opposite sides of said piston.

4. In a driver's valve as claimed in claim 1 means to open and close the high pressure valve, including a compensating air container, a piston operatively connected with said valve and normally exposed to a pressure from said container tending to close said valve, the other side of said piston being exposed upon actuation of the pressure impulse valve to a pressure tending to effect the opening of the high pressure valve, and a spring to close said high pressure valve upon equalization of pressure on opposite sides of said piston, said auxiliary air container being in communication through a throttled opening with a space in the driver's valve in which the pressure adjusted by the pressure regulator prevails.

5. In a driver's valve as claimed in claim 1, a piston adapted to effect the opening of the high pressure valve when actuated by pressure arriving from the filling impulse valve, an automatic interrupting valve interposed in the communication between said filling impulse valve and said piston and adapted to be opened upon the opening of said filling impulse valve, and means whereby said interrupting valve is automatically closed after a short interval of time to interrupt said communication.

6. In a driver's valve as claimed in claim 1, a piston adapted to effect the opening of the high pressure valve when actuated by pressure arriving from the filling impulse valve, an automatic interrupting valve interposed in the communication between said filling impulse valve and said piston and adapted to be opened upon the opening of said filling impulse valve, said interrupting valve being provided with an air leak whereby the pressure on both sides of the valve is gradually equalized, and with resilient closing means to effect closure of the valve upon the occurrence of said equalization.

7. In a driver's valve as claimed in claim 1, a piston operatively connected with the high-pressure valve, said piston being exposed upon actuation of the filling impulse valve to a pressure tending to open said high pressure valve, and another valve operatively connected with the flow valve to relieve said pressure when the flow valve is closed.

8. In a driver's valve as claimed in claim 2, a compensating piston to operate the compensating valve, said piston being influenced by brake pipe pressure to close said valve and influenced by the pressure regulator pressure to open said valve, a second piston co-operating with said compensating piston, which second piston is subjected during the high pressure filling period to main container pressure and on the termination of said period remains under pressure from the auxiliary air container acting against the brake pipe pressure, a third piston also subjected to pressure from said auxiliary air container to open the section changing valve until the brake pipe pressure effects the return stroke of said second piston, whereby the auxiliary air container is exhausted.

9. In a driver's valve as claimed in claim 2, a valve to effect the exhaustion of the auxiliary air container, said valve being controlled by an additional piston co-operating with the compensating valve piston.

10. In a driver's valve as claimed in claim 2, the combination with the auxiliary air container of an indicating device to indicate that said container is exhausted and consequently the flow of air into the brake pipe is completed to release the brakes.

11. In a driver's valve as claimed in claim 2, the combination with the auxiliary air container of a manually operable valve to effect the filling of the said container with air at the pressure of the pressure regulator to effect the opening of the compensating valve.

12. In a driver's valve as claimed in claim 2, a valve adapted to arbitrarily close the communication between the source of compressed air and the compensating valve.

FRIEDRICH HILDEBRAND.
ERNST MÖLLER.